(12) United States Patent
Cassanova

(10) Patent No.: US 9,900,627 B2
(45) Date of Patent: Feb. 20, 2018

(54) SYSTEM AND METHOD FOR PRESENTING INFORMATION ASSOCIATED WITH A MEDIA PROGRAM

(71) Applicant: AT&T INTELLECTUAL PROPERTY I, L.P., Atlanta, GA (US)

(72) Inventor: Jeffrey Patrick Cassanova, Villa Rica, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/351,492

(22) Filed: Nov. 15, 2016

(65) Prior Publication Data

US 2017/0064347 A1 Mar. 2, 2017

Related U.S. Application Data

(60) Continuation of application No. 14/854,228, filed on Sep. 15, 2015, now Pat. No. 9,525,894, which is a
(Continued)

(51) Int. Cl.
*G06F 17/30* (2006.01)
*H04N 21/234* (2011.01)
*H04H 60/37* (2008.01)
*H04N 21/442* (2011.01)
*H04N 21/482* (2011.01)
(Continued)

(52) U.S. Cl.
CPC ....... *H04N 21/23418* (2013.01); *G06F 17/30* (2013.01); *H04H 60/37* (2013.01); *H04N 21/2393* (2013.01); *H04N 21/2407* (2013.01); *H04N 21/4126* (2013.01); *H04N 21/4334* (2013.01); *H04N 21/442* (2013.01); *H04N 21/4722* (2013.01); *H04N 21/482* (2013.01); *H04N 21/4821* (2013.01); *H04N 21/4884* (2013.01); *H04N 21/812* (2013.01);
(Continued)

(58) Field of Classification Search
CPC ............... G06F 17/30; G06F 17/30265; G06F 17/30831; H04N 21/234
USPC .................................................. 707/600–899
See application file for complete search history.

(56) References Cited

U.S. PATENT DOCUMENTS

2005/0076378 A1 4/2005 Omoigui
2006/0210167 A1 9/2006 Inoue et al.
(Continued)

*Primary Examiner* — Isaac M Woo
(74) *Attorney, Agent, or Firm* — Guntin & Gust, PLC; Matthew Tropper

(57) ABSTRACT

A system that incorporates teachings of the present disclosure may include, for example, an apparatus having a processor adapted to receive a message from a portable communication device communicatively coupled to a set-top box presenting a media program and to retrieve from the message a media descriptor associated with the media program. The processor is further adapted to identify according to the media descriptor one or more images of one or more performers commonly presented in the media program, to monitor one or more frames of a live media feed including the media program, and compare the one or more human figures to the one or more images of performers. The processor can also be adapted to recognize a performer from the comparison, to retrieve information associated with the performer, and to transmit the information to the portable communication device. Other embodiments are disclosed.

20 Claims, 5 Drawing Sheets

Related U.S. Application Data continuation of application No. 14/340,034, filed on Jul. 24, 2014, now Pat. No. 9,167,306, which is a division of application No. 13/590,810, filed on Aug. 21, 2012, now Pat. No. 8,825,622, which is a division of application No. 12/896,827, filed on Oct. 1, 2010, now Pat. No. 8,271,534.

(51) Int. Cl.
| | |
|---|---|
| *H04N 21/858* | (2011.01) |
| *H04N 21/239* | (2011.01) |
| *H04N 21/24* | (2011.01) |
| *H04N 21/41* | (2011.01) |
| *H04N 21/433* | (2011.01) |
| *H04N 21/4722* | (2011.01) |
| *H04N 21/488* | (2011.01) |
| *H04N 21/81* | (2011.01) |

(52) U.S. Cl.
CPC ....... *H04N 21/8133* (2013.01); *H04N 21/858* (2013.01); *H04N 21/8586* (2013.01)

(56) References Cited

U.S. PATENT DOCUMENTS

| | | |
|---|---|---|
| 2008/0155600 A1 | 6/2008 | Klappert et al. |
| 2010/0067750 A1 | 3/2010 | Matsuo et al. |
| 2011/0299741 A1* | 12/2011 | Zhang ............... G06K 9/00906 |
| | | 382/117 |

* cited by examiner

200

SYSTEM AND METHOD FOR PRESENTING INFORMATION ASSOCIATED WITH A MEDIA PROGRAM

CLAIM OF PRIORITY

This application is a continuation of U.S. patent application Ser. No. 14/854,228, filed Sep. 15, 2015, which is a continuation of U.S. patent application Ser. No. 14/340,034, filed Jul. 24, 2014, now issued as U.S. Pat. No. 9,167,306, which is a divisional of U.S. patent application Ser. No. 13/590,810, filed Aug. 21, 2012, now issued as U.S. Pat. No. 8,825,622, which is a divisional of U.S. patent application Ser. No. 12/896,827, filed Oct. 1, 2010, now issued as U.S. Pat. No. 8,271,534, which are incorporated herein by reference in their entirety.

FIELD OF THE DISCLOSURE

The present disclosure relates generally to information collection techniques.

BACKGROUND

Media communication systems such as cable TV, satellite TV, and Internet Protocol TV can provide subscribers with hundreds of channel options collectively presenting media programs that span an expansive genre. Consequently, viewers have a rich selection of media programs they can choose from. With such a broad scope of content, subscribers may encounter many actors and actresses that may or may not be known to the subscribers.

DETAILED DESCRIPTION

The present disclosure describes, among other things, illustrative embodiments of a portable communication device that receives information relating to performers recognized by a remote server by monitoring a live feed of a media program. Other embodiments are contemplated by the present disclosure.

One embodiment of the present disclosure includes an apparatus having a processor adapted to receive a message from a portable communication device communicatively coupled to a set-top box presenting a media program and to retrieve from the message a media descriptor associated with the media program. The processor is further adapted to identify according to the media descriptor one or more images of one or more performers commonly presented in the media program, to monitor one or more frames of a live media feed including the media program, and to compare the one or more human figures to the one or more images of performers. The processor can also be adapted to recognize a performer from the comparison, to retrieve information associated with the performer, and to transmit the information to the portable communication device.

One embodiment of the present disclosure includes a portable communication device having a processor adapted to communicatively couple to a media processor presenting a media program, to determine an identity of the media program, and to transmit the identity to a remote server. The remote server can in turn be operable to retrieve one or more images of performers according to the identity received from the portable communication device, to monitor one or more frames of a live media feed of the media program, and to detect from the one or more frames one or more human figures. The remote server can be further operable to compare the one or more human figures to the one or more images of performers, and to recognize a performer from the comparison.

One embodiment of the present disclosure includes a method for presenting a media program at a presentation device, receiving from a portable communication device a request to identify the media program, and transmitting an identity of the media program to the portable communication device. The portable communication device can be operable to transmit the identity to a remote server. The remote server can in turn be operable to recognize a performer from the media program and to transmit information associated with the performer to the portable communication device.

Figure 1:
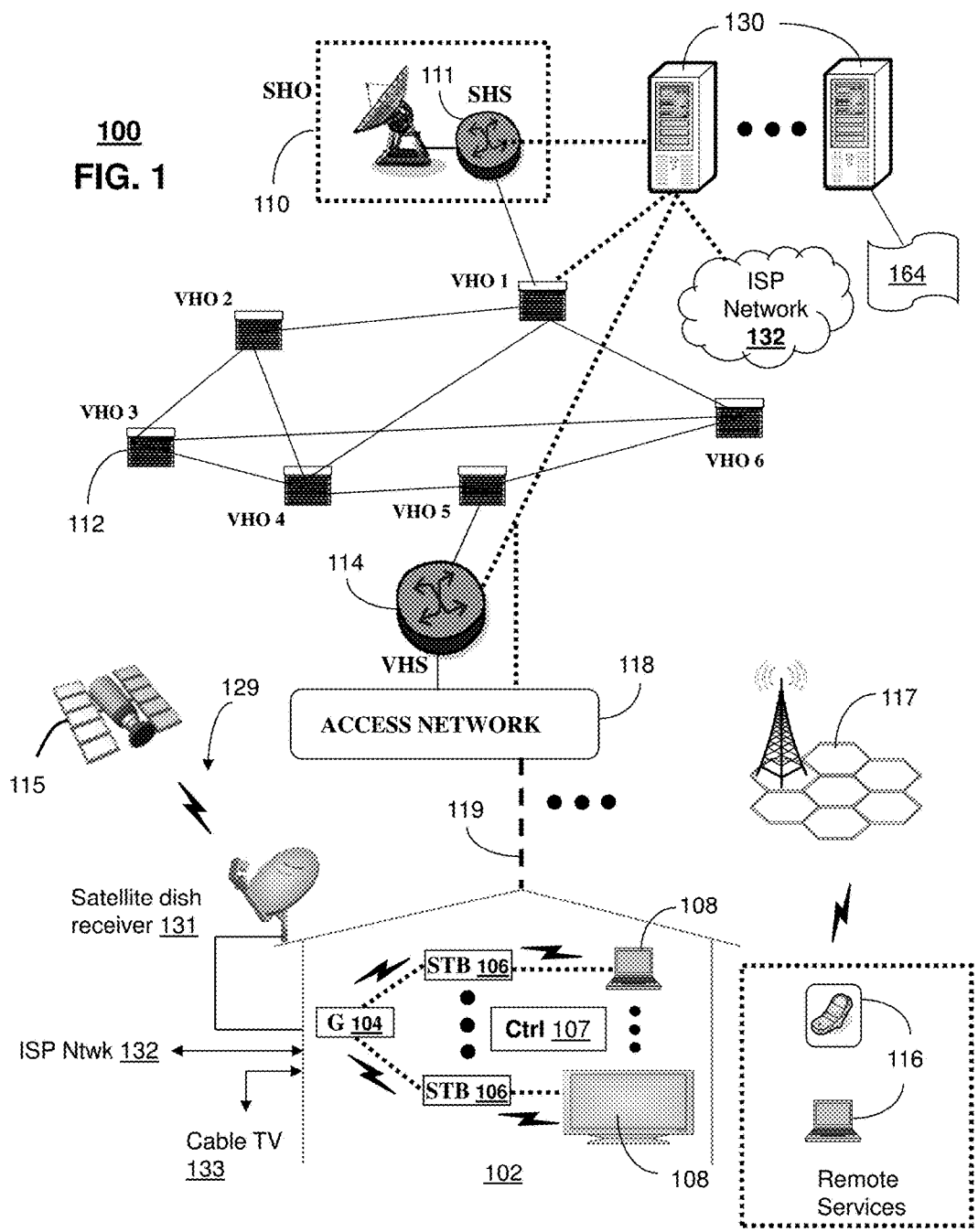
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the present disclosure can apply to any present or next generation over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or wireless communication devices 116.

Multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on). Other present and next generation wide area wireless network technologies are contemplated by the present disclosure.

System 100 can also provide for all or a portion of the computing devices 130 to function as a remote server (herein referred to as remote server 130). The remote server 130 can use common computing and communication technology to perform function 164 which can include, among other things, the acts of communicating with portable communication devices 116 to provide information relating the performers in a media program presented by a media processor 106 communicatively coupled to the portable communication device 116.

Illustrative embodiments of methods that can operate in portions of the devices of FIG. 1 are described below.

Figure 2:
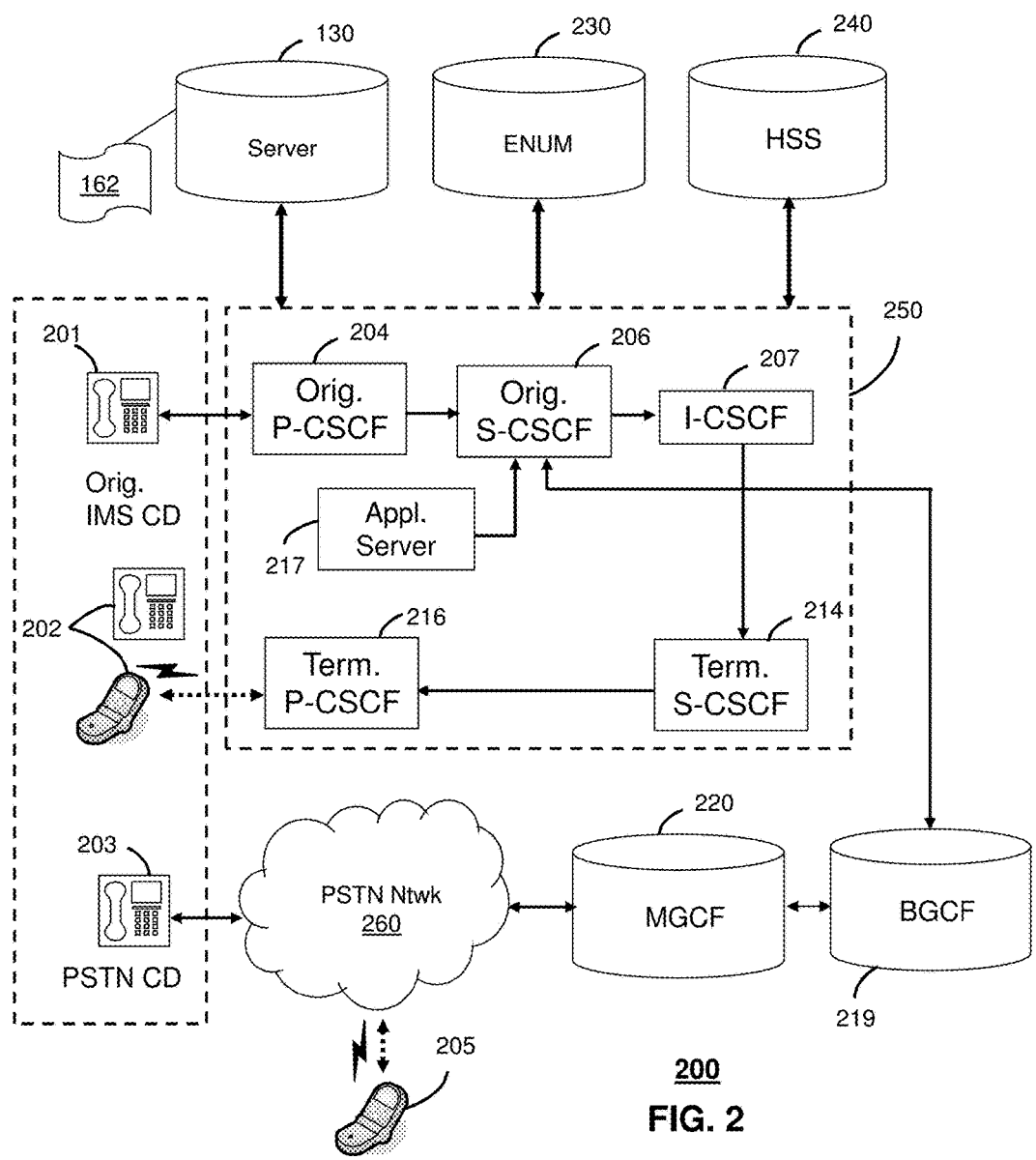

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260. The MGCF 220 is not used when a communication session involves IMS CD to IMS CD communications. Any communication session involving at least one PSTN CD requires the use of the MGCF 220.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to an application server (AS) such as reference 217 that can provide a variety of services to IMS subscribers. For example, the application server 217 can be used to perform originating treatment functions on the calling party number received by the originating S-CSCF 206 in the SIP INVITE message. Originating treatment functions can include determining whether the calling party number has international calling services, and/or is requesting special telephony features (e.g., *72 forward calls, *73 cancel call forwarding, *67 for caller ID blocking, and so on).

Additionally, the originating S-CSCF 206 can submit queries to the ENUM system 230 to translate an E.164 telephone number in the SIP INVITE to a SIP Uniform Resource Identifier (URI) if the terminating communication device is IMS compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish Voice over Internet Protocol (VoIP) communication services, thereby enabling the calling and called parties to engage in voice and/or data communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice communications.

The aforementioned communication process is symmetrical. Accordingly, the terms "originating" and "terminating" in FIG. 2 are interchangeable. It is further noted that communication system 200 can be adapted to support video conferencing. In addition, communication system 200 can be adapted to provide the IMS CDs 201, 203 with the multimedia and Internet services of communication system 100.

It is further appreciated that the CDs of FIG. 2 can operate as wireline or wireless devices. Although not shown, the CDs of FIG. 2 can be communicatively coupled to a cellular base station, a femtocell, a WiFi router, a DECT base unit, or another suitable wireless access unit to establish communications with the IMS network 250 of FIG. 2. Accordingly, multiple wireline and wireless communication technologies are contemplated for the CDs of FIG. 2.

System 200 can include or otherwise be coupled with server 130 of FIG. 1 for purposes similar to those described above. It is further contemplated by the present disclosure that the remote server 130 can perform function 164 and thereby supply CDs 201, 202, 203, or 205 performer information associated with a monitored media program.

Illustrative embodiments of methods that can operate in portions of the devices of FIG. 2 are described below.

Figure 3:
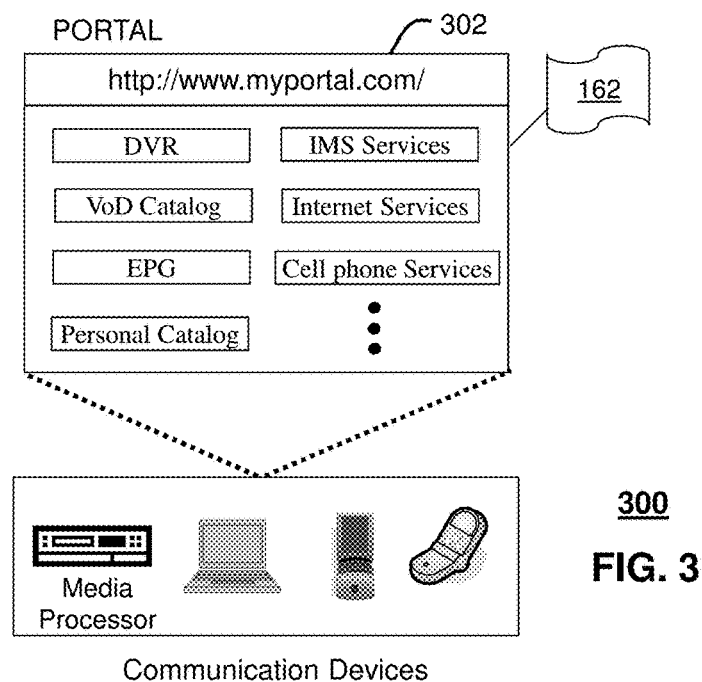
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described for FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored in the media processor 106. The web portal 302 can also be used for provisioning IMS services described earlier, provisioning Internet services, provisioning cellular phone services, and so on.

It is contemplated by the present disclosure that the web portal 302 can further be adapted to manage and provision software applications of the remote server 130, portable communication devices of FIGS. 1 and 2, and the media processor 106 of FIG. 1. Software function 164 in the remote server 130 can make use of the settings provisioned by the web portable 302 to monitor a live feed and present performer information to the portable communication devices of FIGS. 1 and 2.

Illustrative embodiments of methods that can operate in portions of the web portal 302 of FIG. 3 are described below.

Figure 4:
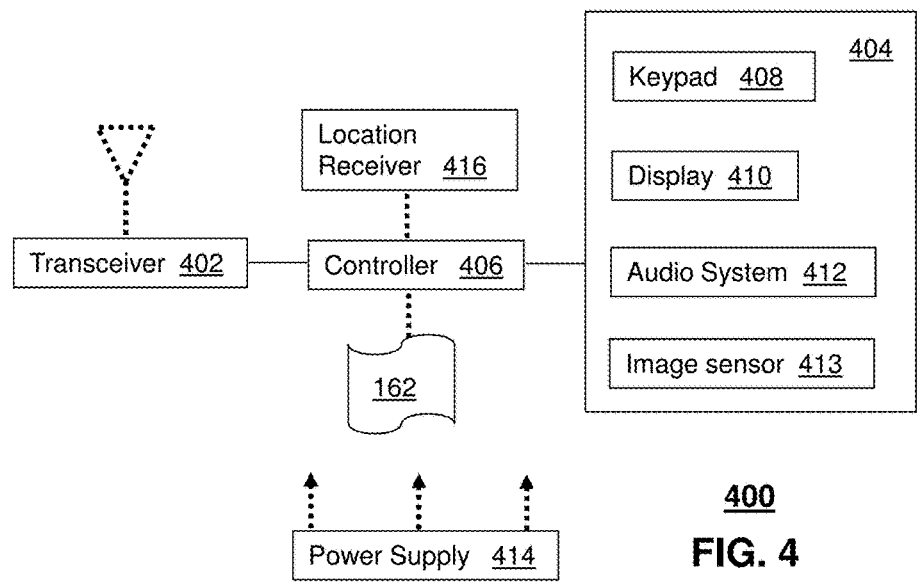
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with its navigation features.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation.

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

It is further contemplated by the present disclosure that the communication device 400 can operate as a remote server 130 performing a function 162 that monitors a live feed and providing performer information determined from aspects of the live feed to a portable communication device.

Illustrative embodiments of methods that can operate in portions of the communication device of FIG. 4 are described below.

Figure 5:
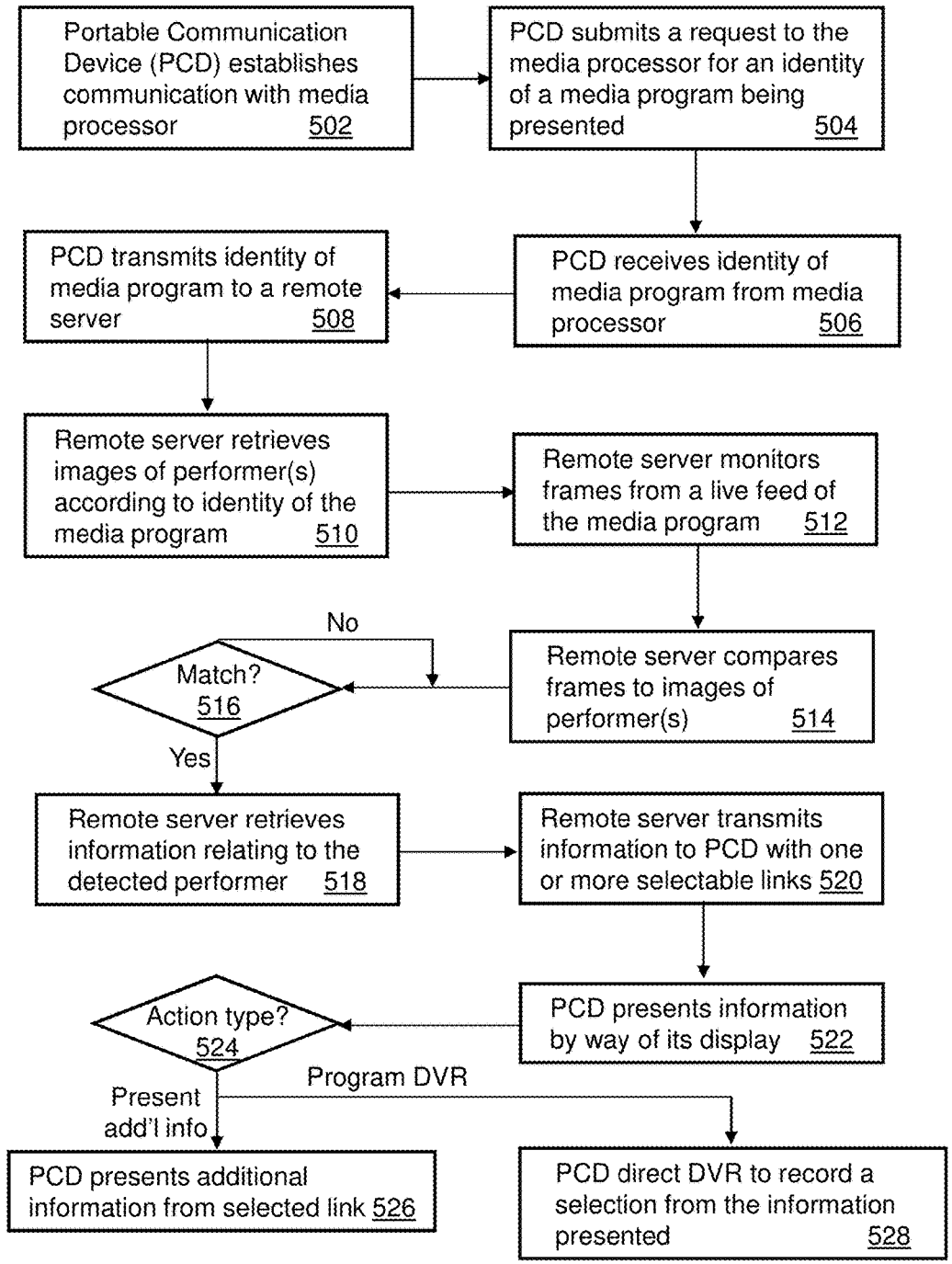
FIG. 5 depicts an illustrative embodiment of a method operating in portions of the systems described in FIGS. 1-4.

FIG. 5 depicts an illustrative method 500 that operates in portions of the devices of FIGS. 1-4. Method 500 can begin with step 502 in which a portable communication device establishes communications with a media processor. A portable communication device can represent multiple forms of wireless devices such as a cellular phone, a personal digital assistant, a smart phone, a tablet, each with long-range wireless capability (e.g., cellular), short-range wireless capability (e.g., WiFi or Bluetooth) capability, or combinations thereof. For illustration purposes, the portable communication device will be referred to by reference 116. It will be appreciated, however, that other portable devices such as those shown in FIGS. 1-4 are contemplated by the present disclosure. The media processor referred to in step 502, can represent, for example, the STB 106 of FIG. 1 which can present media programs such as TV shows, movies, or like programs by way of a presentation device such as a TV set 108. For illustration purposes, the media processor will be referred to by reference 106.

With the above embodiments in mind, the portable communication device 116 can establish communications with the media processor 106 by way of a wireless interface such as WiFi, Bluetooth, cellular (e.g., with a femtocell), or other wireless means. Once communications have been established, the portable communication device 116 can be prompted at step 504 to automatically or by a user-initiated prompt to submit a request to the media processor 106 for an identity of a media program (e.g., TV show, HBO movie, etc.) being presented by the media processor 106 at a presentation device 108.

The portable communication device 116 can be programmed with a user profile configured by a user by way of the web portal 302 to automatically make such requests when coupled to the media processor 106. Alternatively, the user of the portable communication device 116 can be presented a menu or selectable icons in the UI 404 which, when selected by the user, prompt the portable communication device 116 to submit a request to the media processor 106 in step 504.

The identity of the media program can be a title of the media program, a program channel presenting the media program (e.g., channel 5), or other suitable information for identifying the media program. Upon receiving the request, the media processor 106 can identify the media program from metadata supplied by the media communication system (e.g., an EPG). At step 506, the portable communication device 116 can receive the identity of the media program from the media processor 106, and at step 508 transmit the identity to the remote server 130. The portable communication device 116 can transmit this information over the ISP network 132 of FIG. 1, a data channel of the wireless base station 117 of FIG. 1, the IMS network 250 of FIG. 2, or any other suitable communication means for conveying this information to the remote server 130.

At step 510, the remote server 130 can retrieve one or more images of performers associated with the media program based on the identity provided in step 508. For example, suppose a user of the portable communication device 106 is watching a Star Trek episode identified by the media processor 106 by its title. The remote server 130 can search in a (local or remote) database for images of performers associated with the title of the Star Trek episode in question. The images of performers can be collected by a service provider of the media communication system, by a content provider of the media program, or combinations thereof.

Suppose further that the Star Trek episode involves one of the earlier episodes of the Star Trek series with performers such as William Shatner, Leonard Nimoy, DeForest Kelley, James Doohan, George Takei, and so on. The remote server 130 can retrieve in step 510 images from each of these performers. Once the images are in the server's 130 memory, the remote server 130 can be adapted to monitor frames from a live feed of the media program. The remote server 130 can monitor the live feed from a multicast signal generated at a central office (or VHO), or a live feed terminated at or near building 102 where the media processor 106 is located. The remote server 130 can be adapted to monitor frames at periodic intervals that are suitable for analyzing the media program (e.g., monitor frames every quarter second).

As the remote server 130 begins to monitor frames of the media program, it compares human figures detected in one or more frames with the images of performers retrieved in step 510. The remote server 130 can utilize image processing technology to identify human figures. The remote server 130 can also be adapted to detect at step 516 a match between the performer images and the human figures. The remote server 130 can be adapted to analyze facial and/or body characteristics of a detected human figure and compare such characteristics to facial and/or body characteristics of the performer images retrieved in step 510. When a match is detected, the remote server 130 can retrieve in step 518 information relating to the detected performer.

For example, suppose the detected performer is William Shatner. Upon detecting a frame with this performer, the remote server 130 can retrieve from its database information associated with Mr. Shatner. This information can include the performer's history in movies, a list of other movies and TV shows that he's performed in, advertising and/or promotional material associated with the performer. Some or all of this information may be presented as selectable hypertext or hyperlinks. The information can be transmitted by the remote server 130 to the portable communication device 116 by similar wireless communication means used by the portable communication device 116 at step 508.

At step 522, the portable communication device 116 can present the information on its display 410. When more than one performer is detected, the presentation can be organized in quadrants so that the user can visualize each performer's information simultaneously. For a portable communication device 116 having a large form-factor such as a tablet display (e.g., iPAD™), an organizational structure based on a quadrant segmentation of the display 410 can be useful. For portable communication devices 116 having small displays (e.g., a cellular phone), there may only be room for presenting one performer at a time. In such instances, the portable communication device 116 can be adapted so that a user can manipulate the UI 404 to scroll between performers by swiping a touch-display or scrolling between hidden views with a navigation mechanism such as a disk with four depressible sections (left, right, up, down).

The portable communication device 116 can be further adapted to detect in step 524 selections made by the user by way of the UI 404 from the selectable links presented in the information. The portable communication device 116 can act on these selections in a number of ways depending on the function of the selectable link. For example, the information presented at step 522 can include a number of selectable links for viewing a biography of the performer (e.g., William Shatner's life), a documentary of movies and TV shows involving the performer, downloadable movies or TV shows from one or more media sources involving the performer, an EPG that presents upcoming shows including the performer, links to websites associated with the performer, links to advertisements and promotional materials, and so on.

For informational links such as web pages, the portable communication device 116 can be directed to step 526 where it presents additional information from the selected link. The information can be a web page with scrollable information and/or other hyperlinks which can direct a user to other web sites. If instead the user has chosen to act on information that can cause the media processor 106 to perform other tasks, then the portable communication device 116 can proceed to step 528 where it performs a programming function such as programming a DVR. Steps 522, 524 and 528 can represent, for example, a user navigating a listing of media programs associated with the identified performer (e.g., an EPG showing TV and movie listings with William Shatner), the user choosing to record one or more TV or movie listings of the performer at step 524, and a transmission at step 528 of recording instructions directed at a DVR embedded in the media processor 106 or operatively coupled thereto to record the desired programs.

The embodiments of method 500 are non-limiting illustrations of how a user of a portable communication device 116 can view related information of performers of a media program while the media program is being viewed. Viewing performer information with a portable communication device 116 rather than by way of a presentation device 108 (e.g., a TV set) can be more desirable than superimposing or restructuring a viewing area of the media program at the presentation device 108 to accommodate performer information. Method 500 also describes a technique in which multiple viewers of the same media program can have the flexibility to make selections associated with performer information without the viewers disturbing each other.

Upon reviewing the aforementioned embodiments, it would be evident to an artisan with ordinary skill in the art that said embodiments can be modified, reduced, or enhanced without departing from the scope and spirit of the claims described below. For example, method 500 can be adapted so that the media processor 106 can perform all or a portion of the functions of the remote server 130. For instance, the media processor 106 can be adapted to monitor the live feed associated with the media program and perform image recognition analysis to identify performers from known images. To effectively manage storage resources, the media processor 106 can rely on the remote server 130 to provide images of the performers upon supplying the remote server 130 an identity of the media program. This and other embodiments are contemplated by the present disclosure. In yet another embodiment, method 500 can be adapted so that the media processor 106 is operable to transmit to a portable communication device 116 (upon receiving a request from device 116) closed captioned information relating to the media program being viewed. In this embodiment the user of the portable communication device 116 can also view closed captioned information without having it presented at the presentation device 108, thereby not disturbing other viewers who may not have an interest in seeing closed captioned text.

Figure 6:
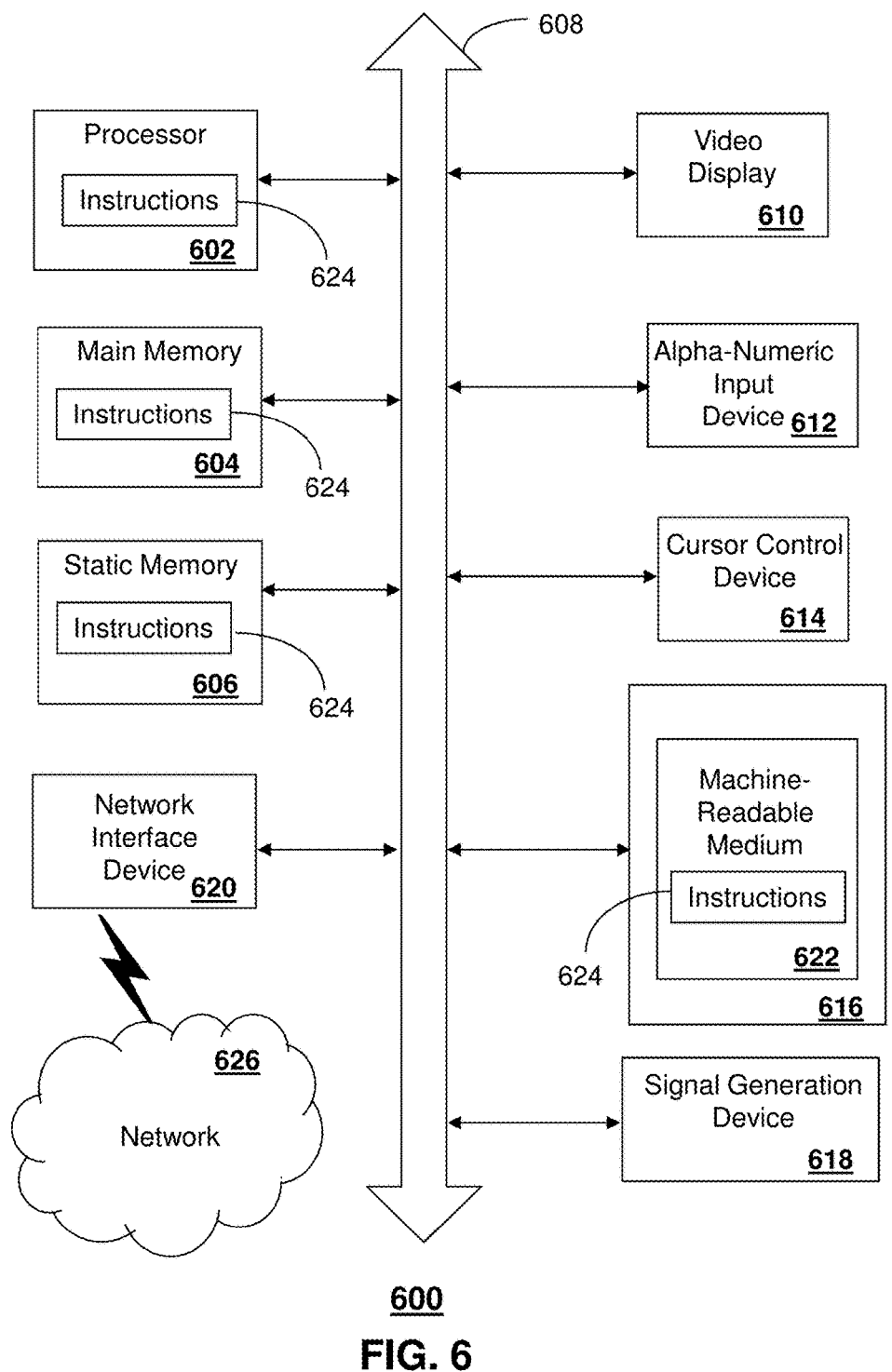
FIG. 6 is a diagrammatic representation of a machine in the form of a computer system within which a set of instructions, when executed, may cause the machine to perform any one or more of the methodologies discussed herein.

FIG. 6 depicts an exemplary diagrammatic representation of a machine in the form of a computer system 600 within which a set of instructions, when executed, may cause the machine to perform any one or more of the methods discussed above. The machine can operate, for example, as the remote server 130, the media processor 106, the gateway 104, or combinations thereof as described above.] In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methods of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus, comprising:
a memory storing computer instructions; and
a processing system including a processor, the processing system being coupled to the memory, wherein the processing system, responsive to executing the computer instructions, performs operations comprising:
receiving a media descriptor, the media descriptor identifying a media program being presented via a live media feed by a media processor;
retrieving an image of a performer presented in the media program, wherein an identity of the performer is determined from the media descriptor and wherein the image of the performer is stored in a database;
detecting, from a frame of the live media feed including the media program, a human figure;
recognizing the performer in the live media feed by comparing the human figure to the image;
retrieving information associated with the performer; and
transmitting the information, resulting in transmitted information.

2. The apparatus of claim 1, wherein the media descriptor is included in a message from a portable communication device.

3. The apparatus of claim 1, wherein the transmitted information is transmitted to a portable communication device.

4. The apparatus of claim 3, wherein the portable communication device is one of a long-range portable wireless communication device, a short-range portable wireless communication device, or combinations thereof.

5. The apparatus of claim 4, wherein the portable communication device is one of a cellular phone, a personal digital assistant, a smart phone, or a tablet.

6. The apparatus of claim 1, wherein the transmitted information comprises one of the identity of the performer, a selection of another media program associated with the performer, advertising material, promotional material, a selectable link to retrieve additional information about the performer, or any combination thereof.

7. The apparatus of claim 1, wherein the transmitted information comprises a plurality of selectable hyperlinks.

8. The apparatus of claim 1, wherein the operations further comprise locating the image of the performer at the database.

9. The apparatus of claim 1, wherein the detecting the human figure comprises periodically monitoring the live media feed.

10. The apparatus of claim 1, wherein the transmitted information comprises metadata associated with the performer.

11. The apparatus of claim 1, wherein the database is updated responsive to new media programs being made available, and wherein the processor comprises a plurality of processors operating in a distributed processing environment.

12. The apparatus of claim 1, wherein the media descriptor comprises one of a title of the media program or a program channel from which the media program is viewed.

13. A method, comprising:
receiving, by a system including a processor, a message, the message including a media descriptor associated with a media program being presented by a media processor via a live media feed;
identifying by the system, according to the media descriptor, an image of a performer, wherein the image is stored in a database before presentation of the live media feed;
detecting by the system, from a frame of the live media feed including the media program, a human figure;
recognizing, by the system, the performer in the live media feed by comparing the human figure to the image, the comparing being based on one of facial characteristics, body characteristics, or a combination thereof; and
transmitting, by the system, information associated with the performer, resulting in transmitted information.

14. The method of claim 13, further comprising retrieving, by the system, the information associated with the performer prior to transmitting the transmitted information.

15. The method of claim 13, wherein the comparing is based on the facial characteristics and the body characteristics.

16. A non-transitory computer-readable storage medium, comprising executable instructions which, responsive to being executed by a processing system including a processor, facilitate performance of operations comprising:
transmitting an identity of a media program being presented by a media processor to a remote server to cause the remote server to identify a first performer presented in the media program, to identify a second performer presented in the media program, to provide first information relating to the first performer, and to provide second information relating to the second performer;
receiving, from the remote server, the first information relating to the first performer and the second information relating to the second performer, wherein the first information and the second information are received from the remote server responsive to the remote server determining that the first performer is present in the media program by comparing a plurality of frames of a live media feed associated with the media program to an image of the first performer associated with the media program and responsive to the remote server determining that the second performer is present in the media program by comparing the plurality of frames of the live media feed associated with the media program to an image of the second performer associated with the media program;
presenting the first information at a display device, wherein the display device has a plurality of visualization segments and the first information is presented in a first one of the plurality of visualization segments; and
presenting the second information in a second one of the plurality of visualization segments of the display device.

17. The non-transitory computer-readable storage medium of claim 16, wherein the operations further comprise transmitting, to the media processor, a request for the identity of the media program being presented by the media processor, and wherein the processor comprises a plurality of processors operating in a distributed processing environment.

18. The non-transitory computer-readable storage medium of claim 16, wherein the visualization segments comprise quadrants.

19. The non-transitory computer-readable storage medium of claim 16, wherein the operations further comprise, prior to transmitting the identity of the media program being presented by the media processor, receiving from the media processor the identity of the media program being presented by the media processor.

20. The non-transitory computer-readable storage medium of claim 16, wherein the operations are performed by a portable communication device.

* * * * *